United States Patent
Yamamoto et al.

(10) Patent No.: US 7,692,109 B2
(45) Date of Patent: Apr. 6, 2010

(54) LEVER SWITCH

(75) Inventors: Satoru Yamamoto, Shizuoka (JP);
Yoshimichi Mochizuki, Shizuoka (JP);
Yuji Migimatsu, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 345 days.

(21) Appl. No.: 11/790,951

(22) Filed: Apr. 30, 2007

(65) Prior Publication Data
US 2007/0278073 A1    Dec. 6, 2007

(30) Foreign Application Priority Data
Jun. 2, 2006    (JP) .............................. 2006-154656

(51) Int. Cl.
*H01H 9/00* (2006.01)
(52) U.S. Cl. ................. 200/61.27; 200/61.54
(58) Field of Classification Search .............. 200/17 R, 200/61.27, 61.3–61.36, 61.54, 332, 335
See application file for complete search history.

(56) References Cited

U.S. PATENT DOCUMENTS

| | | | |
|---|---|---|---|
| 5,003,132 A * | 3/1991 | Lagier | 200/4 |
| 5,075,519 A | 12/1991 | Hayakawa | 200/61.54 |
| 6,624,364 B2 * | 9/2003 | Liburdi | 200/61.27 |
| 2003/0019731 A1 | 1/2003 | Liburdi | 200/61.54 |

FOREIGN PATENT DOCUMENTS

| | | |
|---|---|---|
| DE | 28 54 143 | 7/1980 |
| EP | 1 209 029 | 5/2002 |
| JP | 2000-57906 | 2/2000 |
| WO | WO 92/09455 | 6/1992 |

OTHER PUBLICATIONS

Extended European Search Report mailed Sep. 3, 2007, 8 pages.

* cited by examiner

*Primary Examiner*—Renee S Luebke
*Assistant Examiner*—Marina Fishman
(74) *Attorney, Agent, or Firm*—Kratz, Quintos & Hanson, LLP (57) ABSTRACT

A lever switch is provided, in which an arrangement of a push button is fixed with respect to an operation of a rotary ring to realize improvement in operation. A lever switch includes: a first shaft projecting from a base of a control means of a mobile unit; a plurality of push buttons provided at a distal end of the first shaft; a fixing-supporting part which fixes and supports a plurality of the push buttons for preventing a plurality of the push buttons from rotating relatively to the first shaft; and a rotary ring which is provided in the middle of the first shaft and is rotatable separately from a plurality of the push buttons, wherein when the rotary ring is operated, the rotary ring is rotated around the first shaft on a condition that a plurality of the push buttons are fixed and supported being prevented from rotating.

4 Claims, 7 Drawing Sheets

LEVER SWITCH

BACKGROUND OF THE INVENTION (1) Field of the Invention

The present invention relates to a lever switch including: a shaft projecting from a steering column of a mobile unit such as a motor vehicle; a push button provided at an end-side of the shaft; and a rotary switch provided in the middle of the shaft.

(2) Description of the Related Art

So far, as for a lever switch including: a cylindrical shaft which projects from a steering column attaching a steering wheel as a control means of a mobile unit such as a motor vehicle and controls a wiper function, washer function and so on; a push button attached to an end of the shaft; and a rotary switch provided in the middle of the shaft, the number of rotary switches has been increased to improve convenience by controlling various functions and the shaft itself is made rotatable so as to control the corresponding functions.

As an example of a lever switch for controlling various functions and for improving convenience, in an invention described in Japanese Patent Application Laid-Open No. 2000-57906, the lever switch includes: a rotary knob; a third lever which fixes the rotary knob to one end of the third lever and has an operation rod at an opposite end of the third lever; a second lever having a tube part which makes a shaft bar of the third lever pass therethrough; a first lever which makes the second lever pass therethrough; a fixed part being fixed to the first lever; and a fixed knob arranged at an end-side of the rotary knob. Further, a window hole is formed in an outer peripheral part of the fixed knob and a tab is formed projecting from the window hole so as to be slidably in an axial direction of the lever switch, thereby realizing an arrangement of a slide switch so as to increase the number of the switches and improve convenience.

However, in the invention described in Patent Publication 1, since a push button switch provided at an end of the lever switch is slidably fit to a knob-arranging hole of the fixed knob and a resilient locking piece is locked to a step part within the fixed knob through a restoring spring so as to be fixed integrally, therefore when the fixed knob is rotated, the push button also is rotated equally together with the fixed knob.

Therefore, in a case in which the push button switch consists of a plurality of push button switches, for example, by dividing its round shape into plural parts, if the fixed knob is rotated without operating the push button, the push button is rotated equally together with the fixed knob, resulting in that the arrangement of each push button is changed, causing a problem that an operator cannot operate by recognizing positions of the respective push buttons correctly.

If an operator confirms an end of the lever switch with his eyes and makes sure an arrangement of each push button every time when he operates the push button, an accident might happen if the operator is a driver of a motor vehicle.

SUMMARY OF THE INVENTION

It is therefore an objective of the present invention to solve the above problem and to provide a lever switch, in which an arrangement of the push button is fixed with respect to an operation of a rotary ring so as to realize improvement in operation characteristics.

In order to attain the above objective, the present invention is to provide a lever switch including:

a first shaft projecting from a base of a control means of a mobile unit;

a plurality of push buttons provided at a distal end of the first shaft;

a fixing-supporting part which fixes and supports a plurality of the push buttons for preventing a plurality of the push buttons from rotating relatively to the first shaft; and a rotary ring which is provided in the middle of the first shaft and is rotatable separately from a plurality of the push buttons, wherein when the rotary ring is operated, the rotary ring is rotated around the first shaft on a condition that a plurality of the push buttons are fixed and supported being prevented from rotating.

With the construction described above, since a plurality of the push buttons are fixed and supported being prevented from rotating by the fixing-supporting part, therefore the respective push buttons do not rotate so that the arrangement thereof is fixed with respect to an operation of the rotary ring. Accordingly, a problem that an operator cannot operate by recognizing positions of the respective push buttons correctly due to a change of the arrangement of each push button never takes place, so that the improvement in operation characteristics is realized.

The fixing-supporting part includes:

a fixed ring fixed and supported being prevented from rotating with respect to the first shaft;

a switch base which is provided at a base end-side of plurality of the push buttons and holds a plurality of the push buttons; and an engaging part for engaging the fixed ring with the switch base.

With the construction described above, since the fixing-supporting part is fixed and supported with a locking mechanism by means of the fixed ring fixed and supported being prevented from rotating relatively to the first shaft and the engaging part for engaging the fixed ring with the switch base, therefore a plurality of the push buttons can be fixed and supported being prevented from rotating.

The fixing-supporting part includes:

a second shaft passing through the inside of the first shaft;

a fitting part for fitting the first shaft to the second shaft;

a fixed ring which is provided at a base end-side of the rotary ring, and fixed to and supported by the second shaft being prevented from rotating;

a switch base which is provided at a base end-side of a plurality of the push buttons and holds a plurality of the push buttons, an end of the switch base at a base end-side being fixed to the second shaft; and an engaging part for engaging the fixed ring with the switch base.

With the construction described above, since the fixing-supporting part is fixed and supported with a double locking mechanism by means of the fitting part for fitting the first shaft to the second shaft and the engaging part for engaging the fixed ring with the switch base, therefore a plurality of the push buttons can be fixed and supported being prevented from rotating.

A plurality of the push buttons are for controlling a washer function according to types of the respective push buttons.

With the construction described above, since a plurality of the push buttons control a washer function according to types of the respective push buttons, therefore the operation characteristic with a plurality of the push buttons for controlling a washer function can be improved.

According to a lever switch of the present invention, the arrangement of the push button is fixed with respect to an operation of the rotary ring, thereby realizing improvement in the operation characteristic.

DESCRIPTION OF THE PREFERRED EMBODIMENTS

Figure 1:
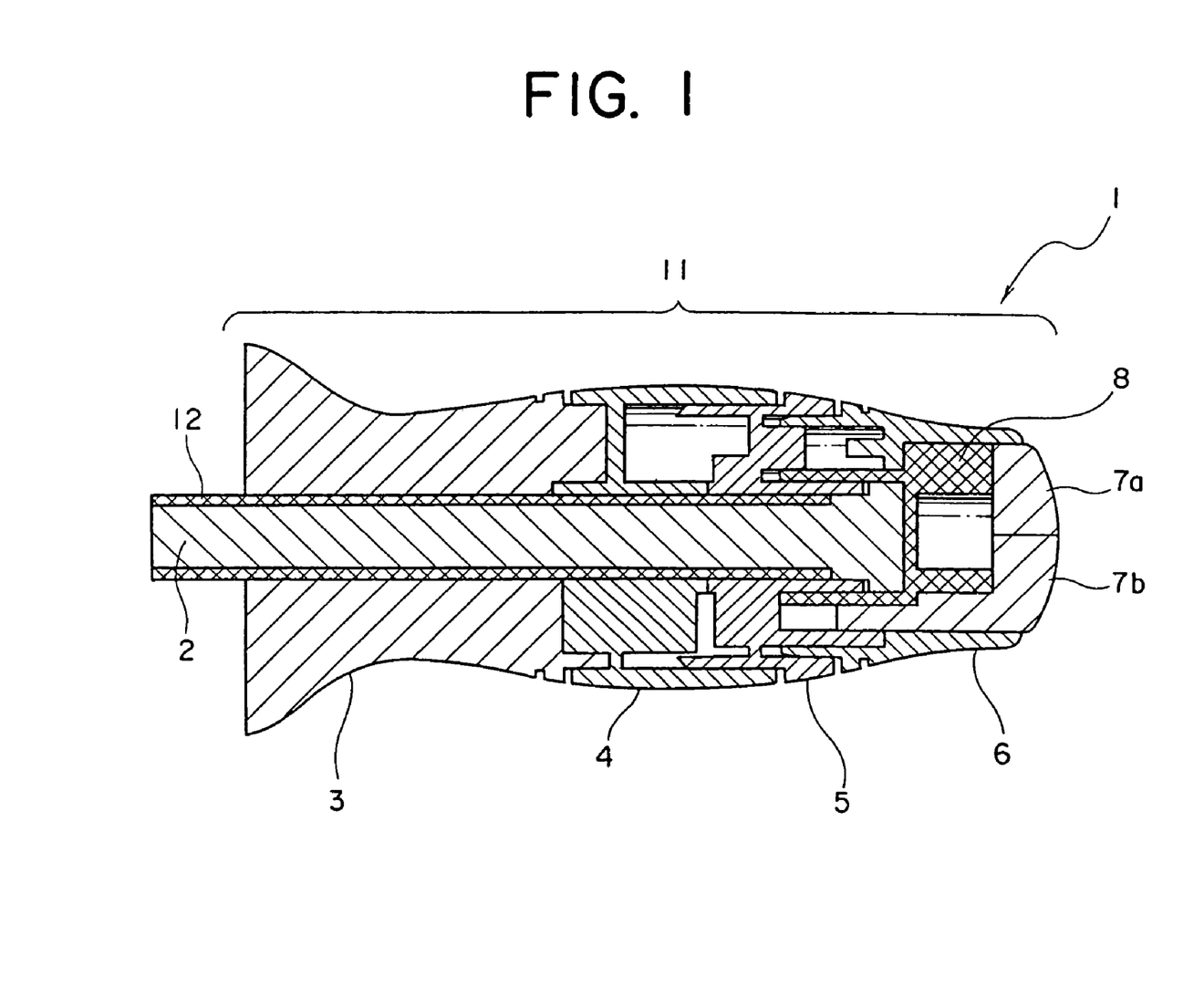
FIG. 1 is an illustration of a whole construction of a lever switch according to a preferred embodiment of the present invention.
Figure 3:
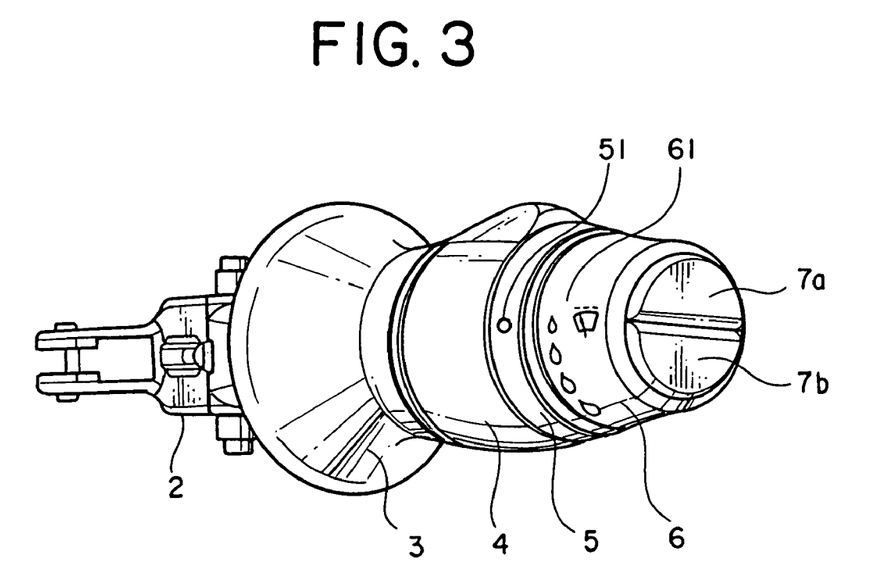
FIG. 3 is a perspective view illustrating a whole construction of an appearance of a lever switch according to a preferred embodiment of the present invention.

In the following, a preferred embodiment of a lever switch of the present invention will be explained with reference to the attached drawings. FIGS. 1 and 3 illustrate a construction of a lever switch according to a preferred embodiment of the present invention. FIG. 1 is a cross sectional view illustrating a whole construction of a lever switch 1. FIG. 3 is a perspective view illustrating a whole construction of the lever switch 1.

The lever switch 1 projects from a steering column as a base, to which a control means such as a steering wheel of a mobile unit such as a motor vehicle is attached. The lever switch 1, that is, a shaft-shaped lever part 11 includes: a long cylinder-shaped first shaft 12, a base-side end of the first shaft 12 being fixed within the steering column and a distal end (i.e. an end opposite to the base-side end) of the first shaft 12 being projects from the steering column; a second shaft 2 passing through the inside of the first shaft 12 for fixing and supporting push buttons 7a, 7b (explained later on) being prevented from rotating; a cover part 3 for covering the base-side of a middle portion of the lever part 11, in which control means such as a switch and ring is not provided; a rotatable operation ring 4 situated adjacent to the cover part 3 and on the distal-end side of the cover part 3; a fixed ring 5 situated adjacent to the operation ring 4 and on the distal-end side of the operation ring 4, the fixed ring 5 being fixed and being prevented from rotating; a control ring 6 situated adjacent to the fixed ring 5 and on the distal-end side of the fixed ring 5, control ring 6 being a rotary ring rotatable separately from push buttons 7a, 7b (explained later on); the push buttons 7a, 7b provided at a distal end of the first shaft 12; and a switch base 8 provided on the base-side of the push buttons 7a, 7b for holding the push buttons 7a, 7b.

Figure 2:
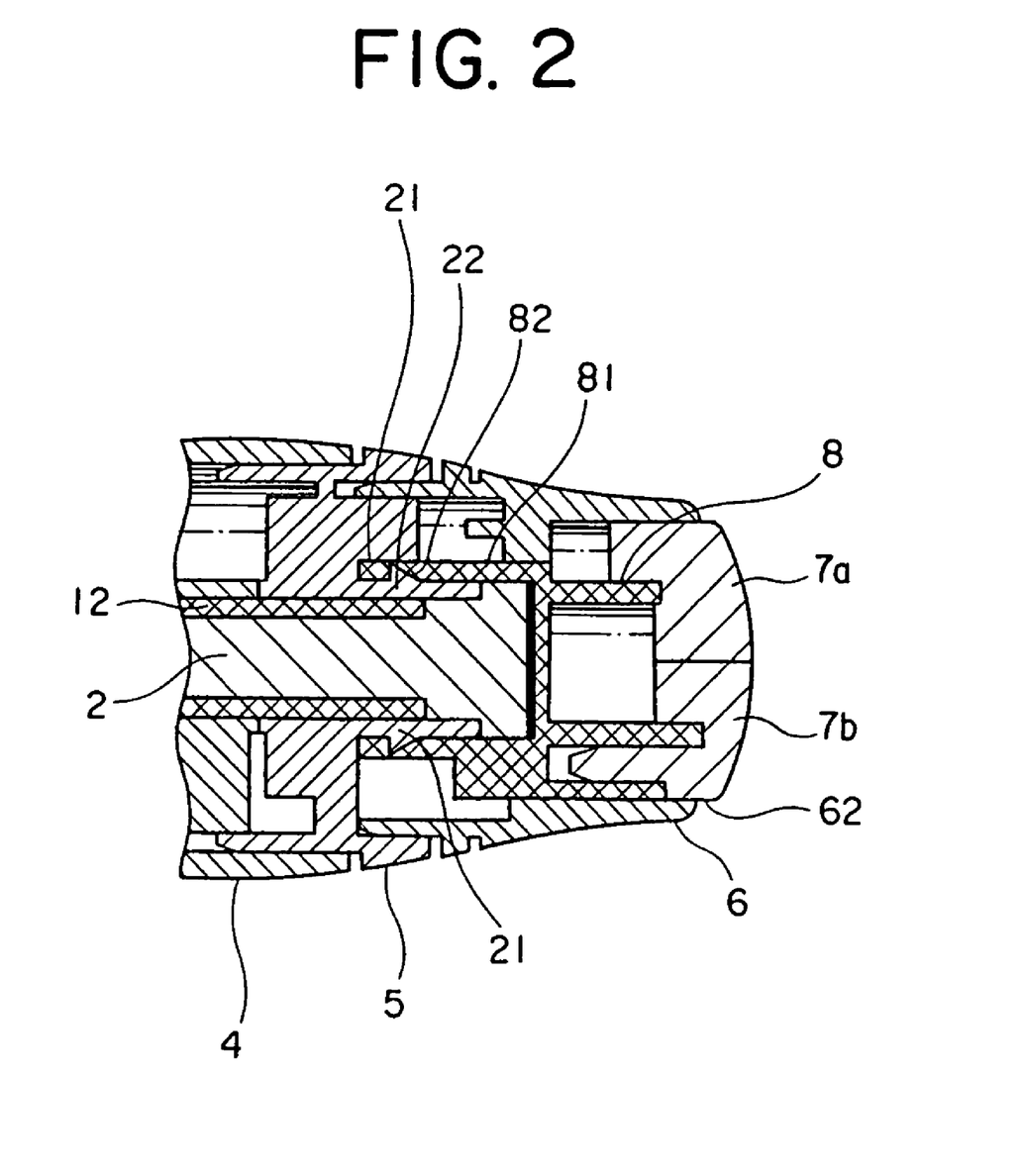
FIG. 2 is an enlarged cross sectional view illustrating a construction of an end part of a lever switch according to a preferred embodiment of the present invention.

The fixing-supporting part includes: the first shaft 12 having a convex part; the second shaft 2 having a concave part; the fixed ring 5 is having a projecting member 21 and engaging part 22; and the switch base 8 having projecting member 81 and engaging hole 82. The fixing-supporting part fixes and supports the push buttons 7a, 7b being prevented from rotating.

The second shaft 2 is, for example, a bar-shaped member, in which a base-side end thereof is fixed inside the first shaft 12 within the steering column, while a distal end (i.e. an end opposite to the base-side end) thereof projects from the steering column and passes through the inside of the first shaft 12. The base-side end of the second shaft 2 is fixed to the inside of the first shaft 12 with a locking mechanism as a fitting part, in which a concave part having a predetermined depth formed on an outer circumferential surface (not shown in the figure) of the base-side end is fit to a convex part projecting inside a long cylindrical body formed in an inner circumferential surface of the first shaft 12 retractable back and forth by resilient force.

When the base-side end of the second shaft 2 is inserted into an insertion part inside the first shaft 12 by matching position of the concave part with that of the convex part, the convex part moves backward pressing an outer circumferential surface except a surface of the concave part of the second shaft 2 by resilient force, the base-side end of the second shaft 2 is inserted. When the concave part reaches the position of the convex part within the steering column in the proximity of the base-side end of the first shaft 12, the convex part advances forward by resilient force so as to fit to the concave part, thereby attaining the locking.

The cover part 3 covers a base-side portion of the first shaft 12, in which the operation ring 4, fixed ring 5 and control ring 6 are not provided. The cover part 3 is fixed to around the first shaft 12 with an adhesive or a screw being prevented from rotating. The cover part 3 is a thick member having the same outer diameter as that of an outer circumferential surface of the operation ring 4 that is adjacent to the distal end-side of the cover part 3. The cover part 3 extends from the outer circumferential surface of the operation ring 4 in such a manner that an outer circumferential surface of the whole lever part 11 is a smooth flat surface.

The operation ring 4 is adjacent to the cover part 3 and is on the distal end-side of the cover part 3. The operation ring 4 is a switch for controlling, for example, an illumination function of a motor vehicle, the switch being formed rotatable with respect to the first shaft 12. The operation ring 4 is a thick ring-shaped member formed rotatable on an outer circumferential surface of the first shaft 12. An inner circumferential surface of the operation ring 4 is rotatable slidingly contacting the outer circumferential surface of the first shaft 12. By adjusting an amount of rotation in the circumference direction of the outer circumferential surface of the first shaft 12 with a switching structure (not shown in the figure), operation such as turning-off of the illumination function, turning-on of a side-marker light or turning-on of a head lamp according to the amount of rotation can be carried out.

FIG. 2 is an enlarged cross sectional view illustrating a construction of a distal end part of a lever part 11. The fixed ring 5 is a ring-shaped member, which is fixed and supported around the first shaft 12, for example, by using an adhesive or screw between the operation ring 4 and the control ring 6, being prevented from rotating. An end of this ring-shaped member situated at the distal-end side thereof continues to the projecting member 21 projecting between an outer circumferential surface of the first shaft 12 and an inner circumferential surface of the control ring 6. A part of the projecting member 21 is provided with an engaging part 22 which engages with the engaging hole 82 of the projecting member 81 situated at the switch base 8-side (explained later on). The engaging part, which engages the fixed ring 5 with the switch base 8, is composed of the projecting member 21, the engaging part 22, the projecting member 81 and the engaging hole 82.

The fixed ring 5 is a ring-shaped member, which has the same outer diameter as that of the outer circumferential surface of the operation ring 4 and the control ring 6. The fixed ring 5 extends from the outer circumferential surface of the operation ring 4, forming a continuous flat surface to the outer circumferential surface of the control ring 6, in such a manner that the whole outer circumferential surface of the lever part 11 is a smooth flat surface. The outer circumferential surface of the fixed ring 5 is provided with an operation mark 51 used for adjusting an amount of rotation of the control ring 6.

The control ring 6, which is adjacent to the fixed ring 5 at the distal end-side, is a switch, for example, for controlling a wiper function of a motor vehicle, which switch is rotatable with respect to the first shaft 12. The control ring 6 is a tubular member formed rotatable with respect to an outer circumferential surface of the first shaft 12 through the projecting member 21 and the projecting member 81 (explained later on). The switch base 8 and the push buttons 7a, 7b are fit to the inside of a circular opening 62 situated at the distal end-side in this sequence.

An inner circumferential surface of the control ring 6 slidingly comes in contact with the outer circumferential surfaces of the first shaft 12, switch base 8, and push buttons 7a, 7b and is rotatable separately from the first shaft 12, switch base 8, and push buttons 7a, 7b. That is, even if the control ring 6 rotates, the switch base 8 and push buttons 7a, 7b do not rotate. Instead, the switch base 8 and push buttons 7a slidingly rotate around the first shaft 12 on a condition that the switch base 8 and push buttons 7a, 7b are fixed to and supported by the second shaft 2 being prevented from rotating.

As shown in FIG. 3, the outer circumferential surface of the control ring 6 is provided with a plurality of operation patterns 61 used for adjusting an amount of rotation of the control ring 6 so as to adjust steps of wiper action of the wiper function. When an operator adjusts an amount of rotation in the circumferential direction of the outer circumferential surface of the first shaft 12 with a switching structure (not shown in the figure) so as to rotate the control ring 6 so that one pattern 61 is positioned with respect to the operation mark 51, an operation of the wiper action at a step according to the amount of rotation can be carried out.

Figures 6A, 6C:
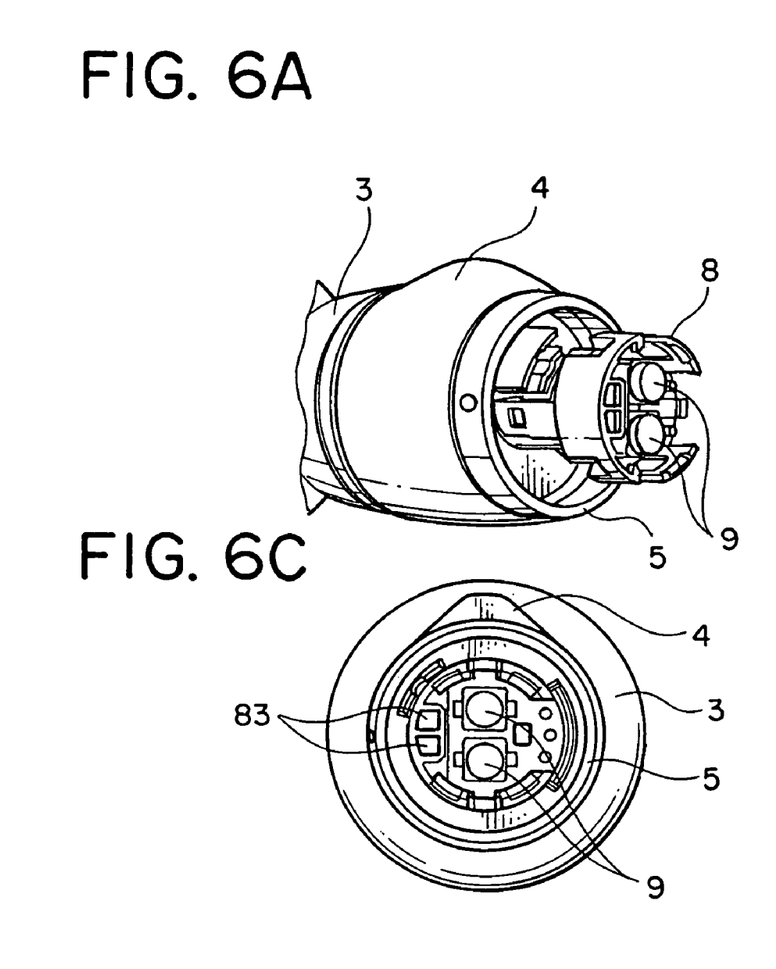
FIGS. 6A, 6B and 6C each are a view illustrating a state when a switch base is attached to a fixed ring of a lever switch according to a preferred embodiment of the present invention.
Figure 6B:
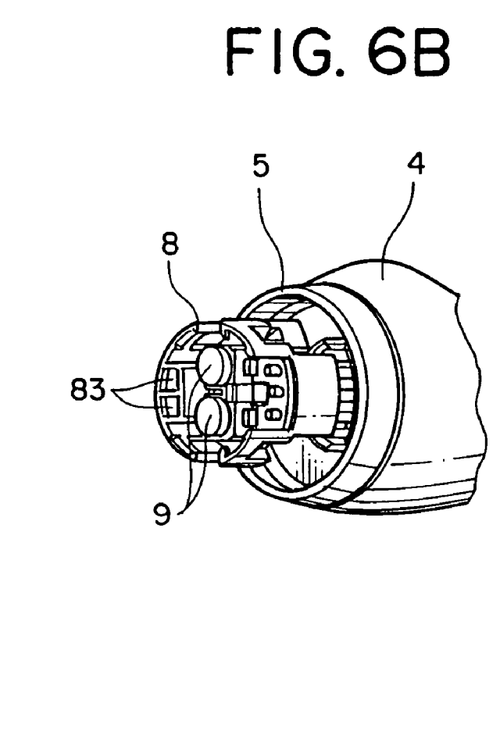
Figure 8A:
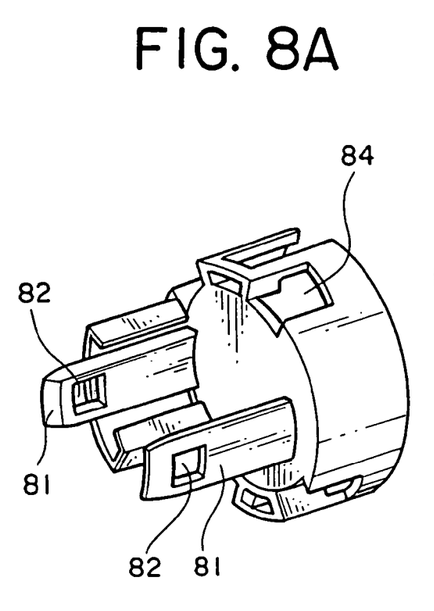
FIGS. 8A and 8B each are an illustration of a construction of a switch base of a lever switch according to a preferred embodiment of the present invention.
Figure 8B:
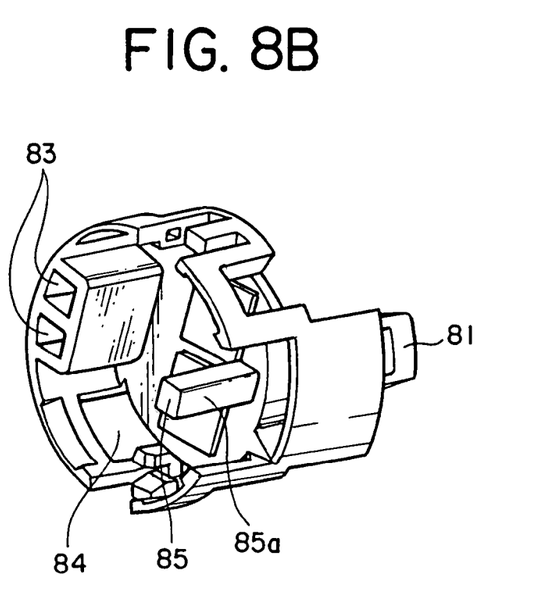

Each of FIGS. 6A, 6B and 6C is a view illustrating a state when the switch base 8 is fixedly attached to the fixed ring 5. Each of FIGS. 8A and 8B illustrates a construction of the switch base 8. The switch base 8 is fit in deeper than the push buttons 7a, 7b, which is inside the opening 62 of the control ring 6, is. The switch base 8 is a member for holding the base-side end of the push button 7a, 7b. The switch base 8 is composed of a cylindrical member and a disc-shaped wall face that closes a base-side end of the cylindrical member. The switch base 8 holds the push buttons 7a, 7b, which are integrally fit inside the cylindrical member.

The inside of the cylindrical member is provided with fitting holes 83, each of which is a tube element having a small diameter and a quadrilateral shape in inside section and formed in parallel to an axial direction of the first shaft 12. The fitting hole 83 fits with a projecting fitting part 72 (explained later on) formed in the push buttons 7a, 7b so as to position the push buttons 7a, 7b and fix and hold the push buttons 7a, 7b. An cylindrical surface of the cylindrical member is provided with a fitting opening element 84 having a small diameter opening. The fitting opening element 84 fits with a projecting fitting element 71 (explained later on) formed in the push buttons 7a, 7b so as to securely fix and hold the push buttons 7a, 7b.

The inside of the cylindrical member is provided with a projecting part 85 having a quadrilateral shape formed in parallel to an axial direction of the first shaft 12. A side face 85a of the projecting part 85 abuts against a guide face 73a of each guide part 73 (explained later on) formed in the push buttons 7a, 7b so as to guide and position the push buttons 7a, 7b.

The base-side of the disc-shaped wall face of the switch base 8 continues to the projecting member 81 which projects between the outer circumferential surface of the first shaft 12 and the inner circumferential surface of the control ring 6. A part of the projecting member 81 is provided with the engaging hole 82, so that the projecting member 81 enters into between the projection member 21 and the inner circumferential surface of the control ring 6, the engaging part 22 of the projection member 21 engages with the engaging hole 82, and the switch base 8 is fixed to and supported by the fixed ring 5 and the first shaft 12. Further, the base-side of the disc-shaped wall face of the switch base 8 is fixed to and supported by a surface situated at the distal end-side of the second shaft 2, which passes through the inside of the first shaft 12 and projects being exposed from an end of the first shaft 12, by an adhesive or fitting.

At the distal end-side of the disc-shaped wall face of the switch base 8, a switch element 9, which is for controlling the washer function by being pressed by the push buttons 7a, 7b operated by an operator, is attached to a position at which the switch element 9 comes in contact with the base end-side of each push button 7a, 7b. When an operator pushes the push button 7a, 7b so that the switch element 9 is pressed through the push button 7a, 7b, the washer function is controlled according to a type of each push button.

Figure 5A:
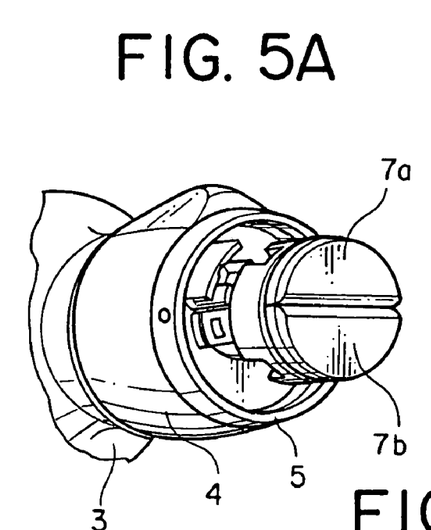
FIGS. 5A, 5B and 5C each are a view illustrating a state when a push button is attached to a fixed ring of a lever switch according to a preferred embodiment of the present invention.
Figure 5B:
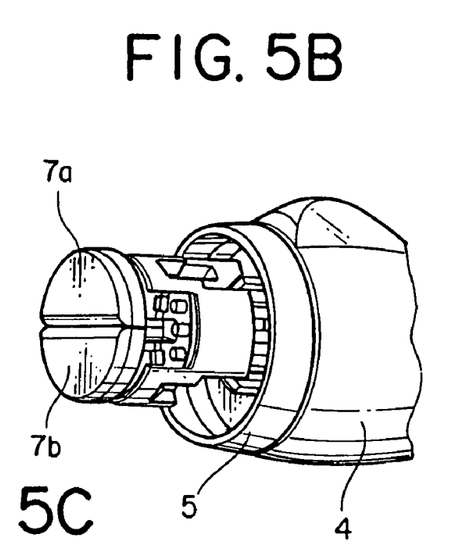
Figure 5C:
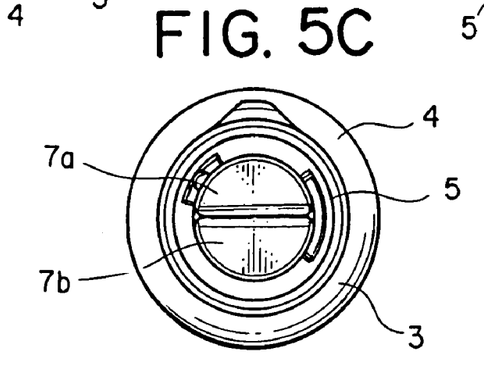
Figure 7A:
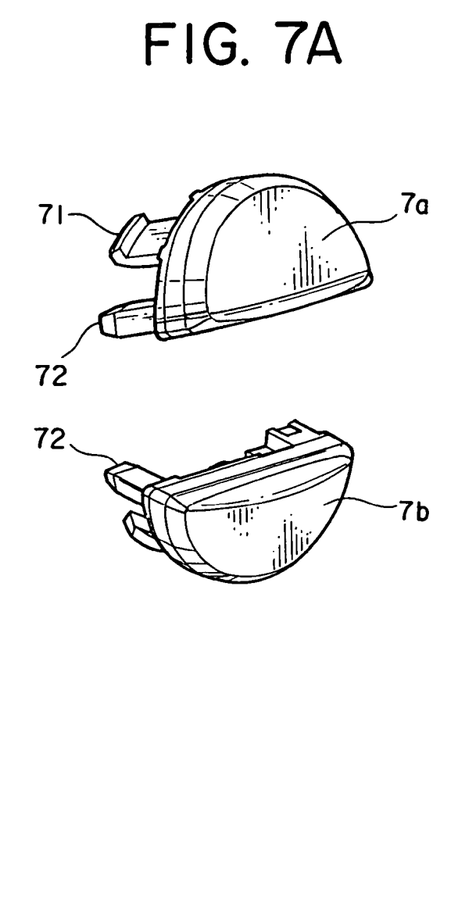
FIGS. 7A and 7B each are an illustration of a construction of a push button of a lever switch according to a preferred embodiment of the present invention.
Figure 7B:
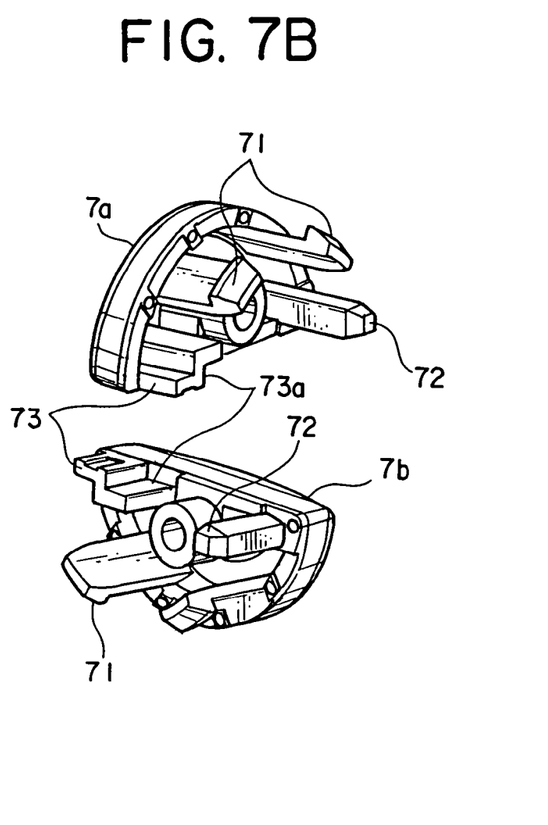

Each of FIGS. 5A, 5B and 5C illustrates a state when the switch base 8 and push buttons 7a, 7b are fixed to the fixed ring 5. Each of FIGS. 7A and 7B illustrates a construction of the push buttons 7a, 7b. Each of the push buttons 7a, 7b is a thick semicircle plate-shaped member, which is formed by dividing an open face of the opening 62 of the control ring 6 according to the number of the push button. The push buttons 7a, 7b are held by the switch base 8 and fit into the inside of the opening 62 on a condition that these push buttons 7a, 7b are combined so as to coincide with the open face of the opening 62. An outer edge portion of an end face at the distal end-side of the push button 7a, 7b is chamfered so as to improve operation characteristic for an operator.

An end face at the base-end side of the push button 7a, 7b is provided with a quadrilateral projection fitting part 72, which has a section coinciding with an inside section shape of the fitting hole 83 and projects toward the base end-side. The projection fitting part 72 fits with the fitting hole 83 so as to position the push button 7a, 7b and fix the push button 7a, 7b to the switch base 8. An end portion of the fitting part 72 is formed pointed so as to facilitate the fitting with the fitting hole 83.

The end face at the base-end side of the push button 7a, 7b is provided with a guide part 73 which abuts against the projecting part 85. The guide part 73 has a L-shape in section which coincides with a section shape of the projecting part 85 when the push buttons 7a and 7b are combined together. A side face of the guide part 73, which abuts against the projecting part 85, is the guide face 73a. That is, each guide part 73 of the push buttons 7a, 7b abuts against the projecting part 85, so that the push buttons 7a, 7b are positioned with respect to the switch base 8.

An outer edge portion of the end face at the base-end side of the push button 7a, 7b is provided with the projecting fitting element 71 consisting of: thin plate-shaped member projecting toward the base end-side; and a projection member projecting from an end of the thin plate-shaped member in an outward direction of the outer edge of the push button 7a, 7b. When the push buttons 7a, 7b are to be held by the switch base 8, the projection member of the projecting fitting element 71 bends a little inwardly so as to slide along the inside of the cylindrical member of the switch base 8 and fits with the fitting opening element 84 so as to securely fix and hold the push buttons 7a, 7b.

In the following, action and effects of the lever switch 1 will be explained. An end portion of the lever switch 1 is provided with the push buttons 7a, 7b formed by dividing the open face of the opening 62 of the control ring 6. When an operator pushes the push button 7a, 7b after confirming the position of each push button 7a, 7b or after put his fingers on the position of the push button 7a, 7b, the switch element 9 of the switch base 8 corresponding to the pressing operation is pressed so as to control the washer function.

Figure 4:
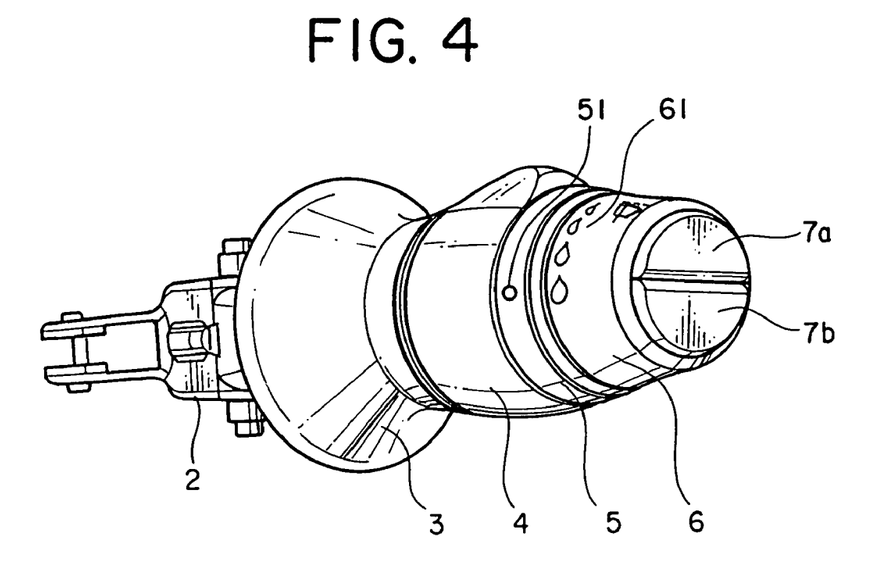
FIG. 4 is a perspective view illustrating a whole construction of an appearance of a lever switch in use according to a preferred embodiment of the present invention.

As shown in FIG. 4, even when an operator rotates the control ring 6 so as to control the wiper action, the push buttons 7a, 7b are fixed and held by the switch base 8, the switch base 8 is fixed and supported by the fixed ring 5 and the first shaft 12, and the inner circumferential surface of the control ring 6 slidingly comes in contact with the outer circumferential surface of the push buttons 7a, 7b and is rotatable separately from the push buttons 7a, 7b, therefore the push buttons 7a, 7b is fixed and not rotated. Only the control ring 6 is rotated by operation.

Accordingly, even if the control ring 6 is rotated by operation, since the positions of the push buttons 7a, 7b are not changed, therefore an operator can put his fingers on a position of the push button 7a, 7b, the position being recognized by the operator in advance, even after the operation, so as to carry out an pushing operation appropriately, that is, improvement in operation characteristic can be realized.

According to the present invention, an operator is not required to confirm a position of each push button 7a, 7b before carrying out a pushing operation every time a rotation operation of the control ring 6 is to be carried out, thereby preventing a possible accident from occurring, that is, realizing improvement in safety.

According to the present invention, the following problem can be solved: the problem being in that a push-button switch is slidably fit in a knob-providing hole of a fixing knob and a resilient locking piece is locked to a step part within the fixing knob so as to integrally fixed thereto, therefore a position of the push-button switch is undesirably changed after a rotation operation of the fixing knob when a plurality of the push-button switches are provided. According to the present invention, an operator can appropriately carry out an pushing operation at a position, which is in advance recognized by the operator.

Further, according to the present invention, the second shaft 2, in which the switch base 8 is fixed, is fixed to the first shaft 12 within the steering column with a locking mechanism by the concave part of the base end-side end thereof and the convex part inside the first shaft 12. Further, the engaging hole 82 of the projecting member 81 engages with the engaging part 22 of the projecting member 21, so that the switch base 8 is fixed by and supported by the fixed ring 5 and the first shaft 12, and each push button 7a, 7b is fixed to and supported by the lever part 11 with a double locking mechanism through the switch base 8.

Therefore, even in a case in which the locking mechanism of the second shaft 2 is off and does not work, the switch base 8 is fixed to and supported by the fixed ring 5 and the first shaft 12. On the other hand, even in a case in which the engaging portion between the projecting member 81 and the projecting member 21 is off and does not work, the switch base 8 is fixed to and supported by the locking mechanism of the second shaft 2. That is, a problem that each push button 7a, 7b comes off from the distal end of the lever switch 1 can be doubly prevented from occurring, thereby realizing improvement in safety.

Furthermore, in the lever switch 1 described above, since the control ring 6 controls the wiper function according to the adjustment of an amount of rotation around the first shaft 12, therefore the operation characteristic can be improved with the lever switch 1.

In the preferred embodiment described above, the switch base 8 holds each push button 7a, 7b, the switch base 8 is fixed to the second shaft 2, and the switch base 8 is fixed to and supported by the fixed ring 5 and the first shaft 12. However, instead of the projecting fitting element 71 and the projecting fitting part 72 situated at the base end-side of each push button 7a, 7b, a construction similar to the projecting member 81 and the engaging hole 82 of the switch base 8 may be provided so that each push button 7a, 7b is directly fixed to the second shaft 2 not through the switch base 8 and is fixed to and supported by the fixed ring 5 and the first shaft 12.

The aforementioned preferred embodiments are described to aid in understanding the present invention and variations may be made by one skilled in the art without departing from the spirit and scope of the present invention.

What is claimed is:

1. A lever switch comprising:
   a first shaft projecting from a base of a control means of a mobile unit;
   a plurality of push buttons provided at a distal end of the first shaft;
   a fixing-supporting part which fixes and supports the plurality of the push buttons for preventing the plurality of the push buttons from rotating relatively to the first shaft; and
   a rotary ring which is provided adjacent to the fixing-supporting part at the distal end side,
   to be rotatable around the first shaft and has an opening in which the plurality of push buttons are fit on a condition that the plurality of push buttons are combined so as to coincide with an opening face of the opening,
   wherein the rotary ring is operated so as to be rotatable separately from the plurality of push buttons and the plurality of push buttons being prevented from rotating.

2. The lever switch according to claim 1, wherein the fixing-supporting part includes:
   a fixed ring fixed and supported around the first shaft and being prevented from rotating;
   a switch base which is provided at a base end-side of the plurality of push buttons and holds the plurality of push buttons; and
   an engaging part for engaging the fixed ring with the switch base.

3. The lever switch according to claim 2, wherein the fixing-supporting part further includes:
   a second shaft passing through the inside of the first shaft; and
   a fitting part for fitting the first shaft to the second shaft;

wherein the fixed ring is provided at a base end-side of the rotary ring, and fixed to and supported by the second shaft; and wherein an end of the switch base at a base end-side is fixed to the second shaft.

4. The lever switch according to any one of claims 1 to 3, wherein the plurality of push buttons are for controlling a washer function.

* * * * *